Nov. 1, 1949.  W. R. FULLER  2,486,559
FISHING REEL
Filed July 29, 1947

INVENTOR.
WILLIAM R. FULLER
BY
Kwis, Hudson, Boughton & Williams
ATTORNEYS

UNITED STATES PATENT OFFICE 2,486,559

FISHING REEL

William R. Fuller, East Cleveland, Ohio

Application July 29, 1947, Serial No. 764,337

8 Claims. (Cl. 242—84.1)

This invention relates to improvements in fishing reels.

One of the objects of the invention is the provision of a reel in which there is a lubricated compartment for the drag and/or click mechanism which shall be effectively sealed against water, sand, and other foreign substances.

Another object is the provision of means for detachably mounting the spool so that interchange of spools may be quickly effected.

A further object is the provision of means for effecting said interchangeability without the use of any loose parts which might be misplaced or lost.

Other objects and features of novelty will appear as I proceed with the description of that embodiment of the invention which, for the purposes of the present application, I have illustrated in the accompanying drawing, in which.

Figure 1:
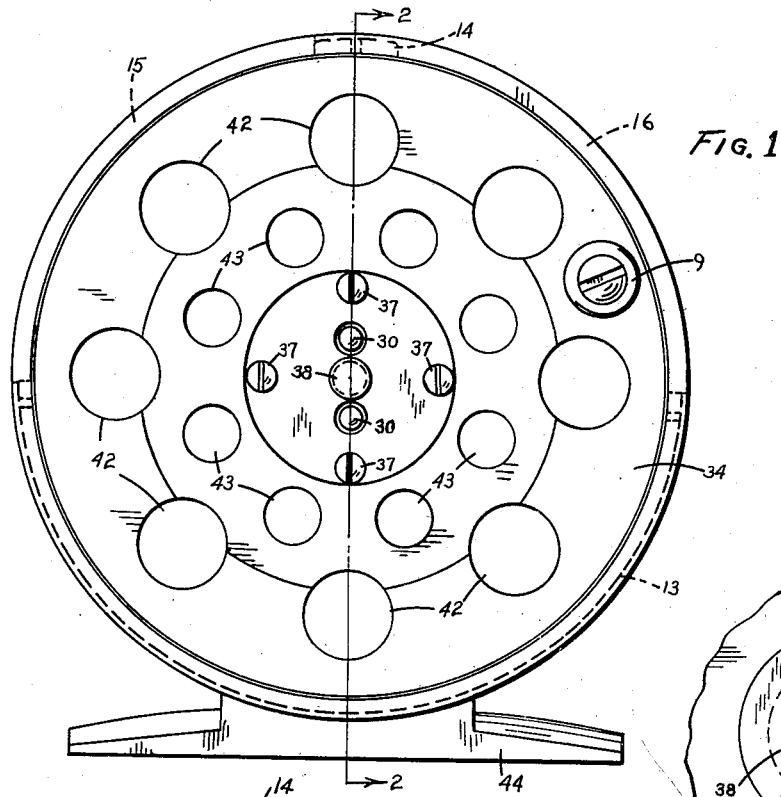
Fig. 1 is an elevational side view of a reel embodying the invention.
Figure 3:
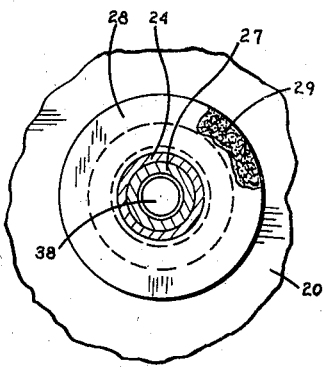
Fig. 3 is a detail sectional view taken substantially on the line 3—3 of Fig. 2.
Figure 2:
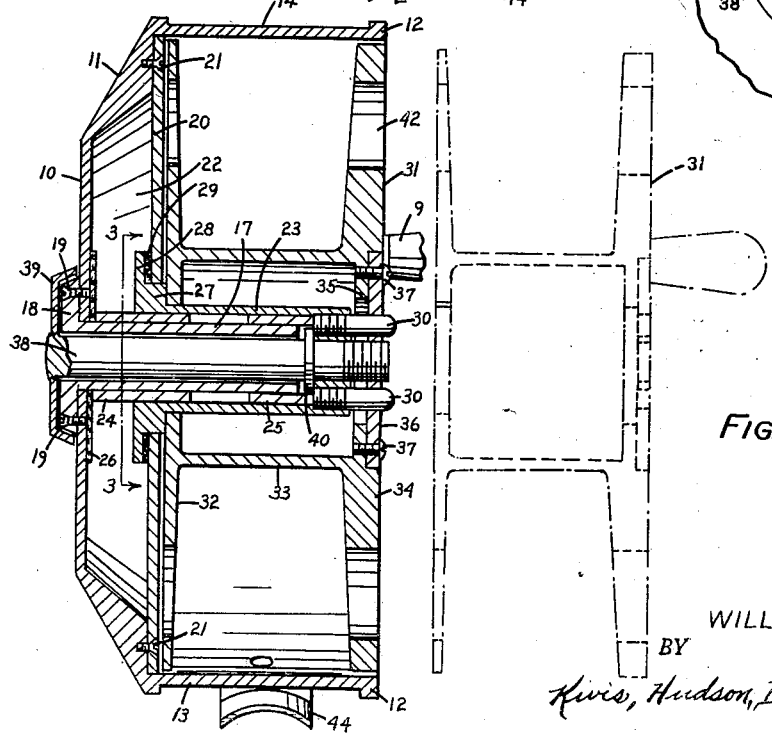
Fig. 2 is a sectional view of the reel, taken substantially on the line 2—2 of Fig. 1.

In the drawing, the housing of the reel is illustrated as having a circular end wall 10, a conical wall 11, and a ring 12, the conical wall and ring being connected by a semi-cyclindrical wall 13 and a stay piece 14, leaving spaces 15 and 16 through which the line may extend.

End wall 10 has a central opening through which projects the cylindrical part of a quill 17 that has an end flange 18 secured to the wall 10 by screws 19 or the like. A plate 20 with a central opening considerably larger than that in wall 10 is secured internally to the radial inner surface of conical wall 11 by screws 21 or otherwise, the engaging surfaces being machined to make a good fit. This plate 20 constitutes a partition wall. Between the walls 10 and 20 there is formed a compartment 22 which is adapted to contain drag and click mechanism of any suitable character, the compartment containing also lubricating oil or grease placed there when the reel is assembled. The drag and click mechanism is not illustrated, such mechanism being well known in the art and constituting no part of the present invention.

A hollow spindle 23 is mounted to turn upon quill 17. In the illustrated case, bushings 24 and 25 are pressed into the hollow spindle 23 and are journaled upon the quill 17. Preferably they are of the type that is impregnated with oil or graphite in order to reduce friction to a minimum. A gasket 26 may be employed to seal the joint between bushing 24 and the stationary parts 10 and 17.

Spindle 23 has an enlargement 27 which fits loosely within the central opening of partition wall 20. The spindle also has a flange 28 between which and the wall 20 there is an annular gasket 29 which constitutes a seal between the relatively rotatable parts 20 and 28. It may be formed of felt, paper, or other material suitable for the purpose. The extent to which bushing 24 projects from the end of hollow spindle 23 controls the position of flange 28, and hence the degree of pressure exerted upon the sealing gasket 29 against the backing of plate 20. This pressure should be such as to provide a good rotative seal without appreciable friction.

The outer end of hollow spindle 23 is closed, and in this closed end there are mounted one or more outwardly projecting pins 30. A spool 31 is mounted upon hollow spindle 23. It comprises an inner circular plate 32 with a central opening slidably fitting spindle 23, a drum portion 33, and an outer circular plate 34. Plate 34 has an inwardly extending circular flange 35, leaving a central opening somewhat larger than the outer diameter of spindle 23. An end plate 36 is attached to this flange by means of screws 37, and is set into a recess in plate 34 to be flush with the surface of that plate. Plate 34 is provided with perforations to receive pins 30, which are driving pins to cause spindle 23 to turn with spool 31. A handle 9 is attached to the spool, as is conventional in the art, in order to enable the operator to turn the spool.

A lock screw 38 extends through the bore of quill 17 with considerable clearance to avoid friction. A knurled head 39 of relatively large diameter is attached to one end of this screw to enable the operator to rotate it readily. Preferably the head is formed to cover and conceal the flange 18 on quill 17. Between the inner end of the quill and the closed end of hollow spindle 23 there is a collar 40 or other abutment on screw 38. The shank of the screw extends through a smooth hole in the end plate of the spindle and is threaded into a tapped hole in plate 36.

The quill, screw, hollow spindle, and plate 36 are preferably constructed of stainless steel. The remaining metal parts are of lighter weight material, such as aluminum, and for a similar purpose the plates 32 and 34 of the spool may be provided with perforations 42 and 43. A scoop or foot 44 of conventional form is provided for removably attaching the reel to a fish pole.

After the other parts of the reel have been assembled, a spool may be slipped onto the spindle 23, the central opening in plate 32 serving by engagement with the spindle 23 to properly center the spool. The spool is then rotated to bring the holes for pins 30 into alignment with those pins, whereupon the spool may be advanced sufficiently to cause the central tapped hole in plate 36 to engage the threads on screw 38. Then the operator grips head 39 with the thumb and fingers of his left hand and the handle 9 with his right hand and turns the spool by its handle to thread the screw into the plate 36, or, of course, he may hold the handle 9 stationary and turn the head 39. The screw 38 draws the spool and spindle together by virtue of the engagement of collar 40 with the end plate of the spindle and the engagement of the threads on screw 38 with those of plate 36. Movement in this direction is limited by the engagement of spool plate 32 with spindle enlargement 27.

As will be apparent to those skilled in the art, the drag and click mechanism (not shown) will be operated by the rotation of those portions of the spindle which project into the compartment 22. This compartment contains lubricant, and foreign matter such as sand and water is effectively excluded by the seal 26.

Different types of fish lines are required for different kinds of casting, wet and dry lines for example. By the use of this invention a fisherman may provide himself with two or more spools upon which different kinds of lines are wound. When he wishes to shift from one type to the other, he merely turns screw 38 to withdraw it from engagement with the spool then on the reel, removes that spool, replaces it with another, and operates the lock screw to hold the new spool in place. In performing this operation there is no danger of losing small parts because there are no loose parts, screw 38 being positively retained by the collar 40.

Having thus described my invention, I claim:

1. In a fishing reel, a housing comprising an end wall and a partition wall, the space between said walls constituting a compartment for enclosing drag and click mechanism, a quill attached centrally to said end wall and extending through a central opening in said partition wall, a hollow spindle journaled upon said quill extending through the opening in said partition wall into said compartment, a rotative seal between said spindle and said partition wall, a spool, means for mounting said spool upon said spindle exteriorly of said compartment and means for attaching the spool to said spindle to rotate therewith at the same speed.

2. A fishing reel as defined in claim 1, wherein said rotative seal is disposed between said partition wall and a flange on said spindle within said compartment.

3. A fishing reel as defined in claim 2, comprising a shoulder on said spindle for engagement with said spool to space the latter from said partition wall.

4. A fishing reel as defined in claim 1, wherein said attachment means is permanently connected with said housing and is quickly detachable from said spool, permitting interchange of spools.

5. In a fishing reel, a housing having a single end wall, a quill attached centrally to said end wall, a hollow spindle journaled upon said quill and overhanging the inner end thereof, a spool mounted upon said spindle, said spool having an operating handle on its outer side, and a screw extending through said quill, threadably connected with said spool and having an operating head outside said end wall, said screw having an abutment engaging said spindle beyond said quill for moving the spool and spindle together axially as the screw is threaded home.

6. A fishing reel as defined in claim 5, wherein said abutment is a collar on the screw adapted to engage the inner end of said quill for preventing removal of the screw.

7. A fishing reel as defined in claim 5, comprising pin and socket means on said spool and spindle to prevent relative rotation thereof.

8. In a fishing reel, a housing comprising an end wall and a partition wall, the space between said walls constituting a compartment for enclosing drag and click mechanism, a hollow quill attached centrally to said end wall and extending through a central opening in said partition wall, a hollow spindle journaled upon said quill extending through the opening in said partition wall into said compartment, a rotative seal between said spindle and said partition wall, a spool removably mounted on said spindle exteriorly of said compartment, a screw having a head engaging said end wall, said screw extending through and being rotatable within said hollow quill and threadably attached to said spool for holding the latter in position axially, and means positively connecting said spool and spindle together for rotation, said means being disengageable when said screw is unthreaded from said spool.

WILLIAM R. FULLER.

REFERENCES CITED

The following references are of record in the file of this patent:

UNITED STATES PATENTS

| Number | Name | Date |
| --- | --- | --- |
| 2,145,474 | Burdick et al. | Jan. 31, 1939 |